US010365961B2

United States Patent
Cady et al.

(10) Patent No.: US 10,365,961 B2
(45) Date of Patent: Jul. 30, 2019

(54) INFORMATION HANDLING SYSTEM PRE-BOOT FAULT MANAGEMENT

(71) Applicant: Dell Products L.P., Round Rock, TX (US)

(72) Inventors: Jerrold L. Cady, Georgetown, TX (US); Craig L. Chaiken, Pflugerville, TX (US); Bryan J. Thornley, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 15/261,168

(22) Filed: Sep. 9, 2016

(65) Prior Publication Data

US 2018/0074884 A1    Mar. 15, 2018

(51) Int. Cl.
*G06F 11/07* (2006.01)

(52) U.S. Cl.
CPC ...... *G06F 11/0787* (2013.01); *G06F 11/0775* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,625,809 B1 * | 9/2003 | Duff | ........................ | G06F 8/60 713/2 |
| 7,266,727 B2 * | 9/2007 | Crowell | .............. | G06F 11/2284 707/999.202 |
| 7,315,962 B2 * | 1/2008 | Neuman | ............. | G06F 11/2268 713/2 |
| 8,589,730 B2 * | 11/2013 | Byom | ................. | G06F 11/0721 714/16 |
| 8,832,455 B1 * | 9/2014 | Drewry | ................. | G06F 21/575 713/187 |
| 8,892,858 B2 * | 11/2014 | Smith | ....................... | G06F 9/24 713/1 |
| 9,223,982 B2 * | 12/2015 | Adams | .................... | G06F 21/57 |
| 2003/0229777 A1 * | 12/2003 | Morais | .................. | G06F 21/575 713/2 |
| 2004/0260678 A1 * | 12/2004 | Verbowski | ............ | G06F 11/008 |
| 2006/0062046 A1 * | 3/2006 | Babudri | .............. | G06F 11/1417 365/185.09 |
| 2010/0062844 A1 * | 3/2010 | Crowder, Jr. | ........... | G06F 21/57 463/29 |

(Continued)

FOREIGN PATENT DOCUMENTS

WO     WO-2007095465 A2 *    8/2007    ........... G06F 21/575

*Primary Examiner* — Amine Riad
(74) *Attorney, Agent, or Firm* — Zagorin Cave LLP; Robert W. Holland (57) ABSTRACT

An information handling system pre-boot fault monitor tracks errors detected before boot of an operating system and stores the errors in persistent memory as error hashes generated from information associated with the error. Corrective actions associated with error hashes are determined by data mining error hashes provided from a population of deployed systems and stored in the persistent memory of the deployed systems. As the pre-boot fault monitor detects errors, a matching comparison between detected error hashes and stored corrective action hashes provides pre-boot instructions with corrective actions so that boot can be completed and the error managed with the operating system after POST.

20 Claims, 3 Drawing Sheets

(56) References Cited

U.S. PATENT DOCUMENTS

| | | | |
|---|---|---|---|
| 2010/0174921 A1* | 7/2010 | Abzarian | G06F 21/57 |
| | | | 713/193 |
| 2010/0205509 A1* | 8/2010 | Kirschner | G06F 11/1012 |
| | | | 714/773 |
| 2018/0124211 A1* | 5/2018 | Athalye | H04L 67/34 |
| 2018/0217059 A1* | 8/2018 | Barbi | G01N 21/64 |

* cited by examiner

INFORMATION HANDLING SYSTEM PRE-BOOT FAULT MANAGEMENT

BACKGROUND OF THE INVENTION

Field of the Invention

The present invention relates in general to the field of information handling system fault management, and more particularly to an information handling system pre-boot fault management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate a wide variety of hardware, firmware and software components to provide flexible operations that readily adapt to a variety of tasks. During normal operations, an operating system executing on a central processing unit (CPU) typically manages the interaction of components, such as with drivers that communicate to hardware components through firmware executing on hardware components. Examples of such management include interactions with display devices through graphics processing units (GPUs), interaction with human interface devices (HIDs) through an embedded (keyboard) controller, interaction with networks through network interface cards (NICs) and interaction with external peripheral devices through Universal Serial Bus (USB) hubs and controllers. Operating systems generally have integrated error management capabilities that report and correct errors that might arise at various hardware and firmware components. For example, once an operating system is executing on a CPU, the operating system can reset components that do not provide expected results and then gather error data to report to the user. Operating systems, such as WINDOWS, have Internet access and relatively large memory storage available to manage error codes related to hardware and firmware components. When errors arise, operating systems present error information to a user with a display. In some instances, operating systems have a "safe" mode that presents information using an integrated graphics processor so that even a failure of the GPU does not prevent communication of error status to an end user.

One difficulty that arises with error reporting is that errors may occur before an operating system is operational. Typically, on power-up the information handling system executes embedded code on a keyboard or other embedded controller to initiate execution of instructions on a CPU that perform a power-on self-test (POST) and then boot the operating system from persistent memory, such as from a hard disk drive or solid state drive. For example, upon initiation of power an embedded controller (EC) executes firmware instructions that assert a platform reset signal on the CPU. In response, the CPU fetches initiation code from an SPI ROM connected through a Southbridge component of a chipset, such as the PCH component on Intel platforms. The initiation code retrieves a basic input/output system (BIOS) stored in flash memory that executes on the CPU and initiates power-up of other hardware components. Once the hardware components are initialized and prepared to interact with the operating system, the BIOS retrieves code for executing the operating system from the persistent storage. The boot process is then handed off to the operating system, which executes its own code to complete boot into an operational state. If an error occurs before initialization of the operating system, then only limited BIOS functionality is typically available to present information to an end user and otherwise handle the error. If the information handling system progresses through BIOS initialization to have an operational display, then the user may get some feedback about detected errors through displayed output. If an error prevents display initialization, the user often has very little indication that an error has occurred other than a blank screen. In some instances, LED indicators may be included to show an error state and provide some limited information about the error state. If, however, an error occurs during power-up and before POST completes, the BIOS may not have any ability to communicate any error state to the end user. In such instances, the end user has a poor experience that often results in return of the information handling system.

In addition to implications for end user experience, pre-boot, no-POST catastrophic failures are difficult to analyze from returned information handling systems. The returned system often has very little useful information to help isolate the failure other than by performing a forensic teardown to find the faulty component. Such tear downs are expensive and do not yield definitive results for the cause of failure in the field. Even where a forensic teardown determines a problem's root cause in a particular information handling system platform, the teardown analysis does not translate well to other types of platforms with similar components. Random sampling of failed systems typically provides an inadequate quantity of information to determine statistically relevant failure trends, especially across different types of hardware platforms. Definitive fault identification allows corrective actions by replacing unreliable component sources, but also helps to define pre-boot code that will complete enough initiation to provide communication of fault information for corrective action instead of dead system with no display. The cost of obtaining statistically significant fault identification information in no-POST no-display failures often exceeds the benefit of fault identifications where fault types are infrequently encountered.

SUMMARY OF THE INVENTION

Therefore a need has arisen for a system and method which provides an information handling system pre-boot fault management.

In accordance with the present invention, a system and method are provided which substantially reduce the disadvantages and problems associated with previous methods and systems for pre-boot fault management of an information handling system. A pre-boot fault manager executes during system initiation to track and store errors in a non-volatile memory fault log, such as with an error hash. Analysis of error hash on the system supports correction action and more precise identification of pre-boot, no-POST system failure root cause.

More specifically, a pre-boot fault monitor detects errors between system power-on and boot of an operating system, and stores the errors in non-volatile memory accessible by pre-boot instructions, such as a BIOS. Errors are stored as a hash that identifies the source of the error, such as the instruction module and offset associated with error, the hardware component associated with the error, and other information associated with the error. Error hashes are communicated to a fault database for analysis and identification of corrective actions. For example, statistical relationships between hash codes, different platform configurations and forensic teardown analysis associate one or more hash codes with corrective actions that support information handling system boot to an operating system that enables more complex corrective actions. Error hash corrective actions are downloaded to deployed information handling systems so that, upon detection of an error hash, a pre-boot fault monitor may look up and take the corrective actions if a detected error hash matches a corrective action. By providing detailed data across plural deployed platforms of detected error hashes, statistically more significant accurate error detection and correction is economically provided to improve fault management for information handling system end users.

The present invention provides a number of important technical advantages. One example of an important technical advantage is that platform pre-boot defects that occur in the field and result in no-POST conditions are tracked and analyzed across multiple hardware platforms to effectively and consistently provide repeatable analytic failure results. A closed loop analytic approach to no-POST failures becomes possible where more efficient data collection related to such failures provides statistically significant fault relations across hardware platforms. Quicker and more accurate identification of root cause for field failures provides rapid corrective actions to address identified failures. For example, software related fixes are updated to deployed information handling systems to address faults and also to track faults should they occur in no-POST situations. In this way, once a fault mechanism is detected, full detection of the extent of the fault becomes possible across different hardware platforms. Embedded code adapts to manage failure mechanisms as the failure mechanisms are detected to provide increased robustness for firmware throughout a product's life cycle.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Pre-boot faults at an information handling system are stored as a hash that incorporates error information in a repeatable fashion so that corrective actions stored in relation to error hashes may be implemented at detection of an error having an associated hash. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
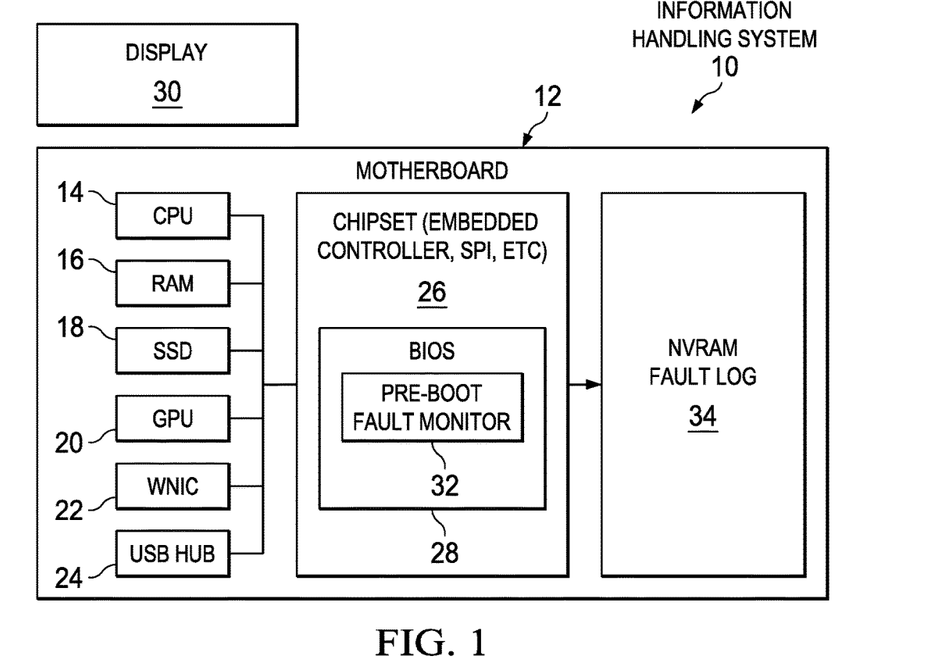
FIG. 1 depicts a block diagram of an information handling system having pre-boot fault monitoring.

Referring now to FIG. 1, a block diagram depicts an information handling system having pre-boot fault monitoring. Information handling system 10 is built from a plurality of processing components that cooperate to process information. In the example embodiment, a motherboard 12 provides electrical signal communication between a central processing unit (CPU) 14 and random access memory (RAM) 16 so that CPU 14 executes instructions to process information in RAM 16. A solid state drive (SSD) 18 or other persistent memory stores instructions and information when power is not available for RAM 16. A graphics processing unit (GPU) 20 processes visual information into pixel values for communication to a display 30 for presentation of visual images. A wireless network interface card (WNIC) 22 supports network communications, such as through wireless wide, local and personal area networks. A universal serial bus (USB) hub 24 provides a serial link for communication with external peripherals. The processing components are managed by a chipset 26, which coordinates interactions at a physical level, such as by the application of power to power buses that supply the different processing components. In various embodiments, other processing components are included in chipset 26 to manage processing interactions, where chipset 26 is a collection of controllers and flash memory devices interfaced through motherboard 12. For example, chipset 26 has plural controllers executing firmware to provide various communication and power protocols, such as Peripheral Component Interconnect (PCI) buses, SPI communication, various power communication protocols, etc. . . . In this respect, FIG. 1 depicts an example embodiment to illustrate pre-boot fault management and other types of physical components may be included. In the example of FIG. 1, chipset 26 generally represents an array of hardware components that cooperate to interact with an operating system executing on CPU 14, such as a power controller, a south bridge, a north bridge, etc. . . . . . Chipset 26 is built on a motherboard 12 and interfaces with other hardware devices, such as an embedded controller that manages input/output device interactions and initial system power up. In various embodiments, the embedded controller may or may not be considered part of the chipset.

Chipset 26 includes embedded firmware code stored in flash memory that executes on an embedded controller and pre-boot instructions that execute on CPU 14, such as a Basic Input/Output System (BIOS) 28. BIOS 28 includes pre-boot instructions that initiate upon application of power to the system embedded controller initiation code, which applies a reset to CPU 14. For example, an embedded controller within chipset 26 powers CPU 14 so that CPU 14 retrieves BIOS 28 for execution of pre-boot and POST instructions. The pre-boot instructions detect the application of power, initialize the processing components, prepare the processing components to execute an operating system, and then call the operating system to execute on CPU 14 in what is known as a boot of the operating system. In a pre-boot status, meaning before the execution of operating system instructions, the pre-boot instructions provide basic end user interactions as physical components initialize and become available, such as interactions with a keyboard or presentation of visual information at display 30. Typically transition from the pre-boot status to execution of the operating system is marked by completion of the power-on self-test (POST). After POST, the operating system boot instructions execute to manage physical components with communications to the physical components coordinated by chipset 26. In various embodiments, various hardware components of chipset 26 support pre-boot instruction execution and POST by interaction with BIOS 28. The software and firmware instructions may include option ROMs or drivers that execute with BIOS 28 or on hardware components that interface with BIOS 28. Collectively these pre-boot instructions are included in the pre-boot error monitoring as described herein.

During pre-boot status, chipset 26 provides fault management in the event a processing component fails to initialize or otherwise fails to properly execute pre-boot instructions in preparation for control by the operating system. A pre-boot fault monitor 32 executing on CPU 14 as part of BIOS 28 manages pre-boot ("No-POST") failures and writes detected errors to a non-volatile RAM (NVRAM) fault log 34. Generally, pre-boot fault monitor 32 may include instructions distributed across processing components of chipset 26 that execute pre-boot so that faults associated with particular components are stored in fault log 34. For example, embedded controller code running on an embedded controller of chipset 26 includes fault monitor 32 so that faults related to initial power up are stored in fault log 34. In part, error handling code is integrated with BIOS 28 so that, as known or expected potential errors are detected, BIOS 28 provides corrective actions to bring information handling system 10 through POST and into condition for boot. In some situations, unanticipated errors occur that provide an error message but do not have specific associated corrective actions. In such situations, BIOS 28 provides general error handling and pre-boot fault monitor 32 writes information associated with the error to NVRAM fault log 34. As an example, BIOS 28 may detect a failure of GPU 20 to initialize, such as a failure to respond with a processing component identifier at application of power, and in response apply specific error handling that initializes a backup graphics processor embedded in chipset components. Since such an error is anticipated, error handling steps are available to manage the error and POST to an operating system with some visual presentation of information available. If instead, GPU 20 correctly initializes but shuts down in response to a power surge at power-up of WNIC 22, an unanticipated and perhaps intermittent error will be generated and managed by general error handling code. These sorts of unanticipated and difficult to analyze errors lead to irregular operations of the information handling system that provide a poor customer experience.

Pre-boot fault monitor 32 tracks unanticipated errors by storing information associated with the unanticipated errors in NVRAM fault log 34 so that the error information is available for subsequent extraction. If information handling system successfully boots to the operating system, the error information is sent by network to a fault database for analysis. If information handling system 10 does not boot to an operational state, NVRAM fault log 34 is read upon return of information handling system 10 such as by direct interaction with motherboard 12. Pre-boot fault monitor 32 stores the error information in a repeatable manner so that the same error on the same hardware platform will generate the same error message. For example, pre-boot fault monitor 32 generates an error hash from the error information and stores the error hash in NVRAM fault log 34. Upon generation of the error hash, pre-boot fault monitor 32 looks up the error hash in NVRAM fault log 34 and, if the error hash already exists, looks up a corrective action to perform in response to the error hash. For example, if the above-described intermittent GPU error is detected and has a corrective action, NVRAM fault log 34 includes a pointer to the corrective action instructions. An example of the corrective action might be an alternative power sequence that allows GPU 20 to remain powered up through POST.

Pre-boot fault monitor 32 generates error hash codes using a predefined set of error information with a goal of creating an identical hash code each time the error is detected. In some embodiments, identical error hash codes are created across different hardware platforms so that the same error will relate across different hardware platforms. Alternatively, error hash codes are analyzed and related across different hardware platforms when communicated to a centralized fault database. Increasing the number of errors detected for a given fault by including analysis across different hardware platforms provides an increased statistical basis for detecting and correcting otherwise infrequent errors. To generate a common hash, pre-boot fault monitor 32 includes information that is repeatedly involved with a detected error. One example of such information is the pre-boot instruction executed at the time of the error detection. For example, pre-boot instructions of BIOS 28 has plural modules or functions that are called in sequence from memory locations offset from the start of the pre-boot instructions. The module offset information may include a line number of the pre-boot instruction code or module within the code. Other examples of information used in the hash may include a dump of processing component state information at the time of the error, such as USB state, PCI bus state, IP and call stack state, HECI firmware status and power management controller cause of last reset information. For example, such information may be kept as an enumeration of a chipset status. In one example embodiment, pre-boot fault monitor 32 generates and stores an error hash before execution of selected vulnerable pre-boot instructions so that the error hash is available in NVRAM fault log 34 in the event of a fatal error. If no error occurs, pre-boot fault monitor 32 erases the error hash upon completion of the selected vulnerable pre-boot instructions; if a fatal error occurs, then pre-boot fault monitor 32 has a record of the error to read before execution of the associated pre-boot instruction so that corrective action may be used to avoid repeat of the same fatal error.

Figure 2:
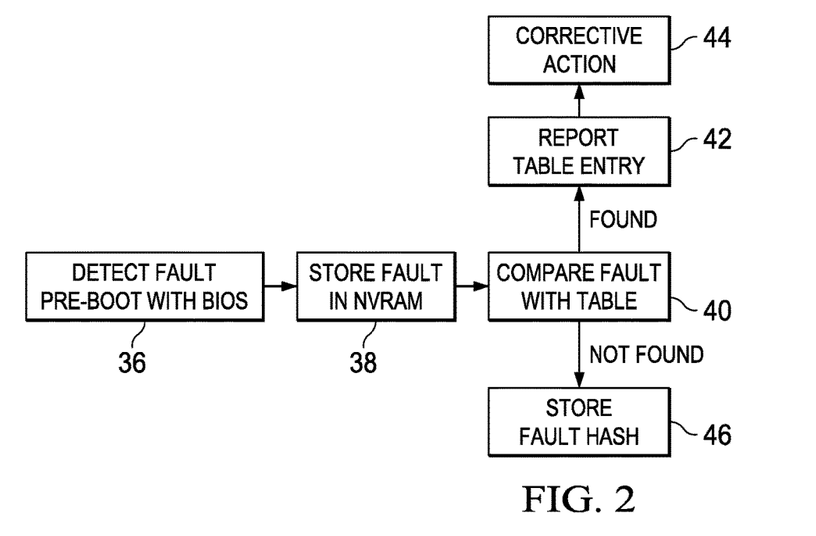
FIG. 2 depicts a flow diagram of a process for managing faults detected at an information handling system pre-boot.

Referring now to FIG. 2, a flow diagram depicts a process for managing faults detected at an information handling system pre-boot. The process starts at step 36 with detection of a fault pre-boot of the operating system by pre-boot instructions of BIOS 28. At step 38, the fault is stored in NVRAM fault log 34, such as by generating an error hash from information associated with the error. As set forth above, the error hash provides a fault signature record that is repeatedly generated from the same fault conditions, thus allowing comparison of the fault signature against a fault table having corrective actions for detected fault signatures. At step 40, the error hash generated from the error information is compared with a fault table stored in NVRAM fault log 34 to determine if any corrective actions are stored in association with the error hash. If a corrective action is found, the error hash is entered in the fault table at step 42 and at step 44, the corrective action is implemented. If no corrective action is found, the error hash is stored in the fault log at step 46 to be available for subsequent analysis when the log is read. For example, after boot of the information handling system, the log is read and the error hash forwarded to a network location for analysis. If the information handling system fails to boot, the error hash is available for extraction upon return of the information handling system to a service center. In some instances, an intermittent fault may result in the same error code being stored in the fault log without a corrective action available to fix the fault. In such a situation, the end user may be provided with notice of the intermittent fault so that the end user may seek repair before a fatal error causes the system to fail.

Figure 3:
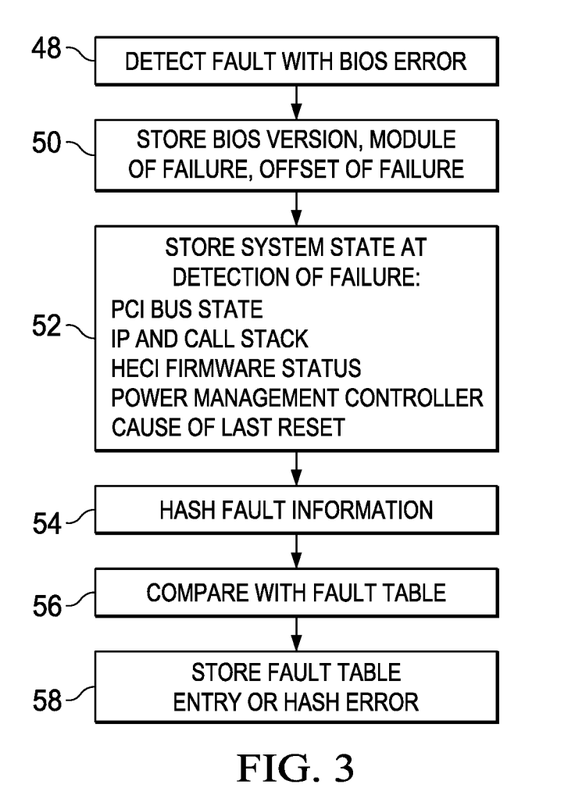
FIG. 3 depicts a flow diagram of a process for generating error hashes in response to detection of a pre-boot fault.

Referring now to FIG. 3, a flow diagram depicts a process for generating error hashes in response to detection of a pre-boot fault. The process starts at step 48 with detection of an error in BIOS pre-boot instruction execution. At step 50, the BIOS version, module of failure and offset of failure are determined and stored. This information provides a reference point for the part of the pre-boot code that was executing when an exception or other error was thrown. In various embodiments, various types of identifying information may be included with a goal creating a repeatable fault signature that is generated at each occurrence of an otherwise unanticipated fault. For example, different levels of specificity may be used depending upon whether cross-platform analysis of faults will be emphasized for the BIOS and hardware platform in question. For example, embedded fault codes within pre-boot instructions may provide a more generalized fault signature when hashed so that cross platform analysis is more easily performed; alternatively, very specific hardware component and BIOS version information may provide more narrow fault signatures that reduce the risk of multiple different types of faults generating a common error hash. At step 52, additional error information is gathered and stored in association with the fault, such as PCI bus state, IP and call stack states, HECI firmware status, and the power management controller cause of last reset. At step 54, an error hash is generated from the fault information and stored in the fault table. At step 56, the error hash is compared with corrective actions available in the fault table so that a correction action stored in association with the error hash may be initiated by the BIOS. At step 58, a record of the fault table entry and corrective action is stored in the fault table. The fault table maintains a circular buffer that is available for download through a network interface or by a direct connection with the motherboard.

Figure 4:
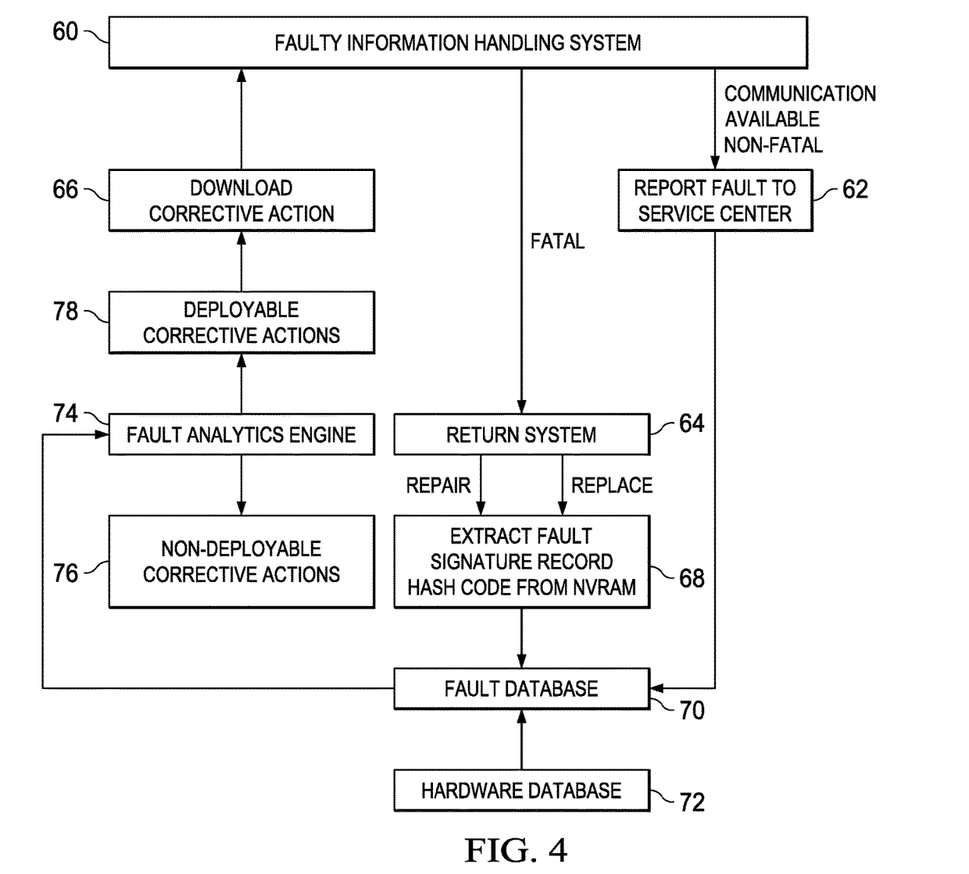
FIG. 4 depicts a network-based system to detect, analyze and correct pre-boot errors at distributed information handling systems.

Referring now to FIG. 4, a network-based system to detect, analyze and correct pre-boot errors at distributed information handling systems is depicted. Two key advantages associated with generation of fault signatures are the ability to identify fault root causes, and the ability to deploy fault corrective actions implemented by reference to the fault signatures. At step 60, a faulty information handling system 10 detects a fault and generates an error hash. If a corrective action is available, such as where a fault is non-fatal, the corrective action is implemented and the fault communicated to a fault database for tracking at step 62. If no corrective action is available on the information handling system, a corrective action exists, and the fault is non-fatal to allow download of a corrective action, the process may continue to step 66 download a corrective action for the detected fault that the information handling system may use in the event of subsequent detection of the error hash. In the event of a fatal fault so that the information handling system is not operable, the process continues to step 64 to return the information handling system to a service center. At step 68 the repaired or discarded information handling system has a forensic analysis that extracts fault signature records from the fault log of the NVRAM to obtain the error hash recorded in association with the system failure. The forensic evaluation may provide additional information related to the root cause of the fault for application with similar error hashes.

At step 70, detected error hashes and related information are stored in a central database. In addition to the error hash, information handling system platform and unique identification information allow a relationship of hardware from a hardware database to the error hash for more in depth analysis. A fault analytics engine 74 applied "big data" statistical analysis in order to relate error hashes with root cause faults and corrective actions. For example, fault analytics engine 74 relates different hash codes to common root cause errors by considering other identifying information, such as platform identifiers and hardware components included in information handling systems that report error hashes. Generally, the greater the amount of related information available for analysis, the greater the statistical odds that a particular fault with relatively low incidence may be isolated and associated with corrective action. The competing constraints for fault analytics engine 74 and pre-boot fault monitor 32 are providing a narrow error hash generation that sufficiently identifies an error so that recreation of the error hash allows application of a particular corrective action, and a broad enough error hash generation so that failure related to the same root cause will have the same error hash even though the error manifests in different manners across different platforms of hardware and software configurations. If a step 74 analyzed errors do not have a deployable corrective action, the process continues to step 76. In such an instance, detection of such error hashes in the field may result in recall of the effected systems or other types of notice to the end users, depending upon the severity with which the error manifests. If a corrective action exists for the error hash, the process continues to step 78 to deploy the corrective action. For example, the error hash and associated corrective action are downloaded to the NVRAM fault logs of deployed information handling systems. If the error hash is subsequently generated at an information handling system, upon lookup in the fault log, the correction action is initiated.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural processing components disposed in the housing and operable to execute instructions to process information, the processing components including at least a processor, the instructions including an operating system executed on the processor;
   a memory disposed in the housing and interfaced with the processor, the memory operable to store the information;
   an embedded controller having pre-boot instructions operable to power on the processing components and initiate execution of the operating system on the processor;
   non-volatile memory interfaced with the pre-boot instructions and operable to persistently store information written by the processing components;
   a pre-boot fault monitor executing on the processing components and operable to detect errors, the pre-boot fault monitor having error handling for known errors having corrective actions and general error handling for unanticipated errors that lack corrective actions, the general error handling applying a predefined set of error information including an operating state at the time of the detected errors to generate a hash and store the hash in the non-volatile memory; and
   a fault table stored in non-volatile memory accessible by the pre-boot fault monitor, the fault table storing hashes of errors associated with corrective actions, the pre-boot fault monitor comparing the hash generated by a detected error with the fault table and applying corrective actions for detected hashes that match fault table hashes.

2. The information handling system of claim 1 wherein the hash comprises at least an identifier of a module of the pre-boot instructions and an offset of the module, offset associated with detection of an error.

3. The information handling system of claim 1 wherein the hash comprises at least an identifier of a hardware processing component disposed in the housing.

4. The information handling system of claim 1 wherein the non-volatile memory stores hashes generated for detected errors in a circular buffer.

5. The information handling system of claim 1 wherein the pre-boot fault monitor is further operable to generate a non-error hash before initialization of one or more hardware processing components.

6. The information handling system of claim 1 further comprising a fault database disposed at a network location, the fault database storing error hashes detected at plural information handling systems and communicated by the network.

7. The information handling system of claim 6 further comprising fault analytics interfaced with the fault database, the fault analytics comparing error hashes across plural hardware platforms to associate errors with varying combinations of hardware processing components and boot instruction module offsets.

8. The information handling system of claim 1 wherein the pre-boot fault monitor reads hashes in the fault table stored from a most recent previous boot before initialization of hardware components.

9. A method for monitoring faults at an information handling system, the method comprising:
   detecting application of power at an embedded controller of the information handling system;
   in response to detecting application of power, executing pre-boot instructions stored in persistent memory, the pre-boot instructions resulting in boot of an operating system;
   monitoring the executing of pre-boot instructions to detect errors;
   in response to detecting an error, generating an error hash by applying a predefined set of error information related to operating conditions of the information handling system at a time of the error; and
   storing the error hash in non-volatile memory accessible by the pre-boot instructions.

10. The method of claim 9 further comprising:
    detecting upon the application of power that an error hash is stored in the non-volatile memory; and
    in response to detecting the error hash, reading the error hash before initiating the pre-boot instructions.

11. The method of claim 10 further comprising:
    in response to detecting the error hash, comparing the error hash with error hashes stored in a fault table;
    finding a match between the error hash and an error hash stored in the fault table; and
    applying a corrective action associated with the error hash in the fault table.

12. The method of claim 9 wherein the error hash comprises an identifier of a module of the pre-boot instructions and an offset in the module at which the error occurred.

13. The method of claim 9 wherein the error hash comprises an identifier of a hardware component associated with the detected error.

14. The method of claim 9 further comprising:
    writing an error hash before initialization of one or more hardware components, the error hash identifying the component and initialization; and
    deleting the error hash after completion of initialization without an error.

15. A system for managing information handling system faults, the system comprising:
    a pre-boot fault monitor integrated in plural information handling systems, the pre-boot fault manager applying predefined operating state information of an information handling system at detection of an error to generate a hash and storing the hash in the non-volatile memory;
    a fault database interfaced with the pre-boot fault manager through a network and operable to store hashes provided from the plural information handling systems;
    a fault analytics engine interfaced with the fault database and operable to associate one or more of the hashes with a fault and a corrective action; and
    a fault table stored in persistent memory of each information handling system and accessible by the pre-fault monitor, the fault analytics engine updating the fault table with hashes and corrective actions through the network, the pre-fault monitor comparing detected error hashes with fault table hashes to determine corrective actions.

16. The system of claim 15 wherein the hash comprises an identifier of the portion of code executing to pre-boot the information handling system at the detection of the error.

17. The system of claim 15 wherein the hash comprises an identifier of a hardware component interacting with pre-boot instructions of the information handling system at the detection of the error.

18. The system of claim 15 wherein the hash comprises a communication bus state at detection of the error.

19. The system of claim 15 wherein the hash comprises a chipset status having an HECI status, USB state, PCI state and power management controller cause of last reset.

20. The system of claim 15 wherein the hash comprises an IP and call stack state.

* * * * *